Nov. 28, 1950 W. J. O'BRIEN 2,531,919
RADIO FREQUENCY NAVIGATIONAL AID
Filed Feb. 4, 1947 2 Sheets-Sheet 2

INVENTOR
William J. O'Brien

Patented Nov. 28, 1950

2,531,919

UNITED STATES PATENT OFFICE 2,531,919

RADIO-FREQUENCY NAVIGATIONAL AID

William J. O'Brien, London, England, assignor to The Decca Record Company, Limited, London, England, a corporation of Great Britain Application February 4, 1947, Serial No. 726,249
In Great Britain February 6, 1946

8 Claims. (Cl. 343—105)

My invention relates to radio frequency navigational aids and has particular reference to an equi-phase displacement type of radio beacon system employing very high frequency pulse signals and finding particular utility when used at short range for accurately and precisely guiding mobile vehicles such as surface ships and aircraft.

In the navigation of mobile vehicles such as surface ships and aircraft there is needed a short range navigational aid for guiding the navigation of such vehicles with great accuracy and precision. For example, during bad weather and low visibility it is difficult, if not impossible, to control the movements of aircraft at airports and to successfully land aircraft on the runways.

A similar problem exists in the navigation of surface ships through fog-bound harbours and channels and particularly in the region of docks and similar locations where great accuracy is required.

Prior to my invention there have been devised a number of short range navigational aids which may be termed "pulse systems," in which a line of position through the location of the mobile vehicle is identified by measuring the time difference of arrival of pulses transmitted simultaneously from two spaced points. These systems do not solve the problem of accurate blind navigation because of the difficulty in measuring the time intervals with the requisite accuracy. Radio waves, being propagated at the speed of light, travel 300 metres in one micro-second, thus requiring time difference measurements to be made to a few hundredths of a micro-second if the error is to be reduced below 100 feet. There also obtains the further difficulty of measuring to the required accuracy the relatively small difference between two relatively large quantities. The requirement for measuring the time differences with great accuracy gives rise to numerous attendant disadvantages, not the least of which is the elaborate, expensive and relatively heavy apparatus required to be installed on the mobile vehicle. A cathode ray tube is the only device now available for measuring the short time intervals involved and the use of such measuring apparatus requires the services of skilled and specially trained operators.

Furthermore, since the time difference data is presented by way of a trace on a cathode ray tube screen, considerable time is required for the operator to translate these time measurements into distances and to perform such plotting operations as may be required to fix his position. An aircraft travelling at a speed of 300 miles per hour will travel a distance of 2½ miles after the fix is taken and before the result is known, if the operation can be performed in as short a time as a half minute.

The above described pulse systems do have certain definite advantages, among which may be named the short range over which they are operative, thus permitting the use of many systems in relatively adjacent areas without interference between the systems. Furthermore, the transmitting apparatus is small and relatively inexpensive. Because of the high frequencies used, no difficulties are encountered by way of sky waves reflected from the upper ionized layers of the earth's atmosphere.

Long wave equi-phase displacement systems lack the above enumerated advantages of the pulse type systems but do have the advantages of providing equal or higher accuracy of position determination as well as obtaining such accuracy with a relatively low precision measurement of the phase of the received signals. Furthermore, the equi-phase displacement systems allow the result to be presented on suitably calibrated phase meters, which provides a continuous indication of the vehicle's position and indicates the continuous change of position as the vehicle moves. Furthermore, the meter presentation allows the readings to be made rapidly and as frequently as desired, and also permits the vehicle to be navigated to predetermined readings so that the arrival of the vehicle at a predetermined location can be noted instantly.

Prior to this invention is was not possible to extend the equi-phase displacement systems into the very high frequency spectrums because there are not yet available transmitters capable of continuously radiating signals of any appreciable strength. Furthermore, at the very high frequencies, it is difficult, if not impossible, to hold the relative phase of the transmitted signals within the required limits of accuracy.

It is therefore an object of my invention to provide a radio frequency navigation aid which is particularly suitable for relatively short range work and which provides the advantageous features of both the pulse and equi-phase displacement systems while overcoming their above noted disadvantages.

It is also an object of my invention to provide a radio frequency navigation aid which includes transmitting apparatus for radiating from a pair of spaced points very high frequency signals which are pulsed at different but harmonically related repetition rates.

It is an additional object of my invention to provide a navigational aid of the character set forth in the preceding paragraphs which includes a receiving apparatus for simultaneously receiving the transmissions from both points and for measuring the multiple phase relation between transmitted pulse rates.

It is a still further object of my invention to provide a navigational aid of the character hereinbefore described in which the received pulses are converted to substantially sine waves and subjected to separate frequency conversions to provide a pair of equal frequency signals, the phase relation of which may be directly measured and indicated.

It is also an object of my invention to provide a navigational aid of the character referred to in the preceding paragraphs which includes a phase regulating apparatus for maintaining a fixed multiple phase relation between the different pulse repetition rates.

Other objects and advantages of my invention will be apparent from a consideration of the following specification read in connection with the accompanying drawings, wherein.

In obtaining a "fix" or determining the location of a vehicle, the point of location may be considered as defined by two intersecting lines of position. Thus any system which is capable of defining a line of position passing through the location of the vehicle is susceptible to positively fixing the location of the vehicle by merely duplicating the apparatus to the extent required to define a second line of position also passing through the vehicle's location and disposed angularly with respect to the first mentioned line of position.

Accordingly, while for the purposes of simplification the ensuing description has been limited to apparatus for defining a line of position passing through the location of the mobile vehicle, it falls within the scope of this invention to employ additional equipment of the same character for establishing and defining another line of position through the vehicle's location to thereby provide a positive fix as to the vehicle's geographical location.

Figure 1:
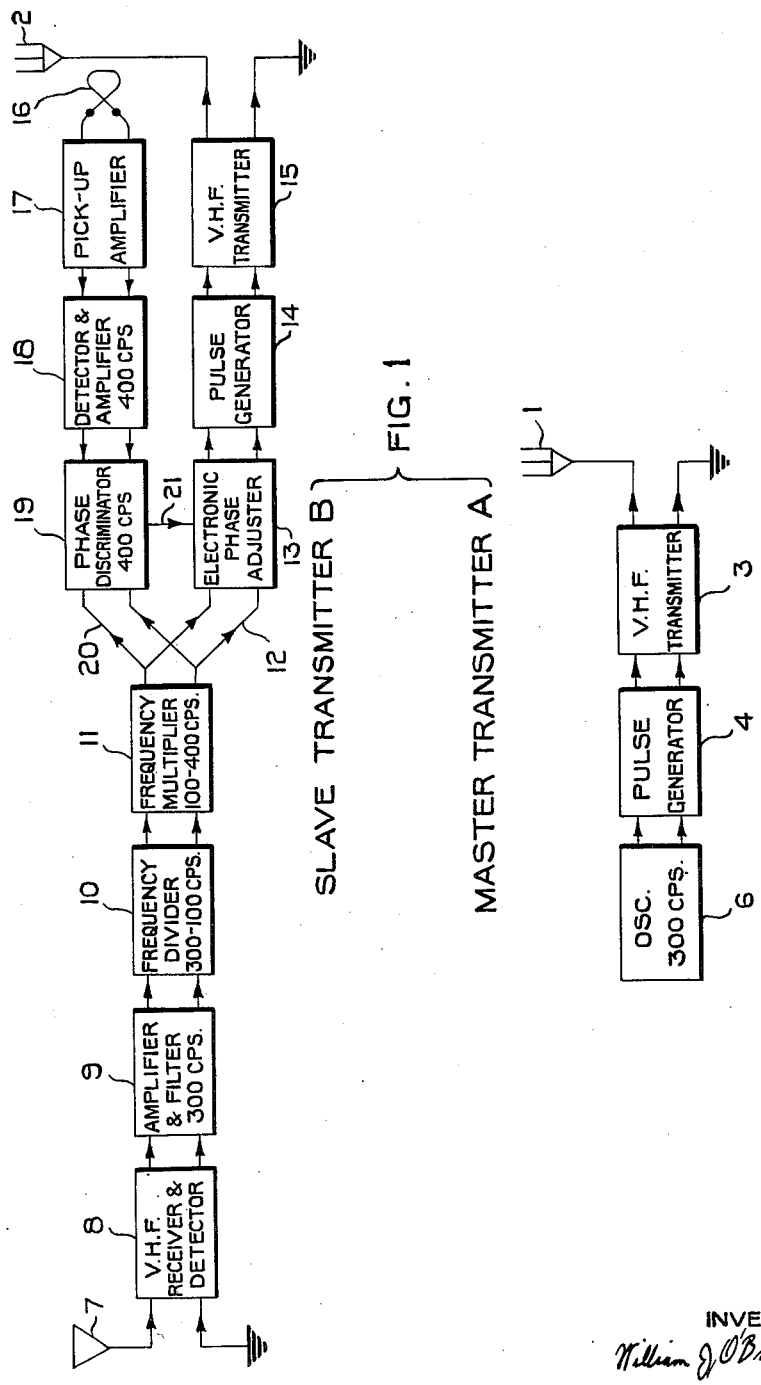
Fig. 1 is a block diagram illustrating master and slave transmitting apparatus which may be employed as the transmitting portion of the navigational aid of my invention.
Figure 3:
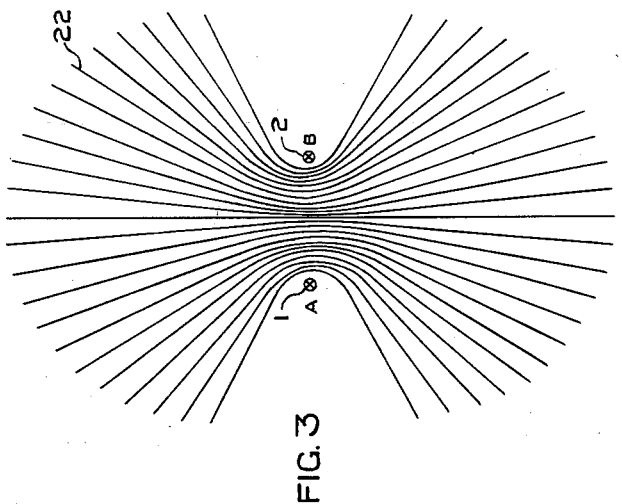
Fig. 3 is a diagram representing in plan view the equi-phase displacement contours generated by the operation of the transmitting apparatus.

Referring to the drawings, I have illustrated in Fig. 1 master and slave transmitting equipment constituting the transmitting portion of the apparatus of my invention. The master transmitting equipment is arranged to radiate very high frequency pulse signals from an antenna 1, while similar signals are radiated by the slave transmitting equipment from an antenna 2. These antennae are spaced from each other at locations A and B as is indicated in Fig. 3.

Figure 2:
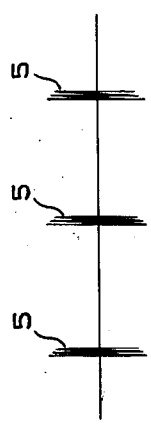
Fig. 2 is a diagram representative of the type of signal radiated at the transmitting apparatus.

The master transmitting equipment may comprise a very high frequency pulse type transmitter 3, which is coupled in a conventional manner to the antenna 1. Operation of the transmitter 3 is controlled by a pulse generator 4, so that the energy radiated from the antenna 1 consists of a series of pulses or short bursts of very high frequency radio energy such as is represented at 5 in Fig. 2. It will be understood that these pulses are of extremely short duration, preferably of the order of a few microseconds, and that during the dead time between pulses no energy is radiated from the transmitting antennae. The repetition rate of the pulses 5 is determined by an oscillator 6 which is connected to the pulse generator in such a manner as to trigger its operation once each cycle of the frequency generated by the oscillator.

As will be explained hereinafter, the pulse repetition rate of the master transmitter is made different than but harmonically related to that of the slave transmitter. By "harmonically related" I mean that both repetition rates are harmonics of the same fundamental frequency. For the purposes of explanation, I have assumed a pulse repetition rate for the master transmission of 300 pulses per second, while the slave transmission is assumed to be at the rate of 400 pulses per second, these two repetition rates representing the third and fourth harmonics respectively of a fundamental repetition rate of 100 pulses per second. It will be understood, of course, that other fundamental rates and other harmonics of these fundamental rates may be used as desired, the rates of 100, 300 and 400 being chosen herein for illustrative purposes only.

The operation of the system described herein depends upon maintaining a fixed multiple relation between the pulse repetition rates of the master transmitter and the slave transmitter. Accordingly, the pulses transmitted by the slave transmitter are preferably derived directly from the master transmissions, and to this end I employ at the slave transmitter location B a receiving antenna 7 which is coupled to a very high frequency receiver and detector 8. The output of the detector 8 is fed to an amplifier and a 300 cycle filter 9 operating to reject the 400 cycle pulse frequency radiated from antenna 2 and passing only the 300 cycle pulse frequency which is received from the master transmitting antenna 1.

The output of the amplifier 9 is applied to the input of a frequency divider 10 serving to produce an output signal which may be of substantially sine wave form but having a frequency equal to the aforementioned fundamental frequency, that is a frequency of 100 cycles per second. The 100 cycle output frequency is fed to a frequency multiplier 10 serving to produce a 400 cycle output signal. This output signal is fed as indicated at 12 through an electronic phase adjuster 13 to a pulse generator 14, which is coupled to control the operation of a very high frequency pulse transmitter 15, the output of which is applied to the transmitting antenna 2.

The apparatus thus far described serves to cause radiation from antenna 2 of pulse signals at a repetition rate of 400 pulses per second, the repetition rate being determined directly by the 300 pulse per second rate of the transmissions from the master antenna 1.

In addition, I also include apparatus for maintaining a fixed multiple phase relation between the pulse recurrence frequencies. This apparatus includes a pick-up coil 16 located adjacent to antenna 2 and serving to pick up therefrom a very small fraction of the energy radiated. The pick up coil 16 is coupled to an amplifier 17, the output of which is connected to a detector and tuned amplifier circuit 18 operating to apply a 400 cycle signal of substantially sine wave form to one input circuit of a phase discriminator 19. The other input circuit of the phase discriminator 19 is coupled as shown at 20 to the output of the frequency multiplier 14.

The phase discriminator 19 operates to compare the phase of the 400 cycle signals received from the detector and amplifier 18 with the phase of the signals received from the frequency multiplier 14, and to produce a direct potential, the magnitude of which is representative of the phase between the two input signals. This direct potential is applied as indicated at 21 to the electronic phase adjuster 13 to control the operation of that device in such a way as to shift the phase of the transmitted signals in a direction opposing changes in phase relation detected by the phase discriminator 19.

It will be seen that the apparatus described constitutes a phase regulating apparatus serving to maintain a fixed phase relation between the two 400 cycle input signals to the phase discriminator 19 and thus operating to maintain a fixed multiple phase relation between the 400 cycle pulse recurrence frequency of the signals radiated from antenna 2 and the 300 cycle pulse recurrence frequency of the signals radiated from antenna 1.

While any suitable forms of available conventional apparatus may be employed for the various component parts of the apparatus described hereinbefore, it is preferred to use for the frequency divider circuit 10, the electronic phase adjuster 13, and the phase discriminator 19, apparatus of the character which is disclosed respectively in the following co-pending applications: Serial No. 612,990, filed August 27, 1945, Patent No. 2,483,556, granted October 4, 1949, and entitled Frequency Divider Circuit; Serial No. 612,985, filed August 27, 1945, and entitled Radio Frequency Transmission Apparatus, now abandoned; and Serial No. 612,991, filed August 27, 1945, Patent No. 2,500,200, granted March 14, 1950, and entitled Multiple Channel Radio Frequency Receiver.

Where mention has been made to very high frequency signals, reference is intended to that portion of the radio frequency spectrum lying above frequencies of the order of 30 megacycles, and preferably the system is operated at a much higher frequency of the order of magnitude of 100 megacycles per second. However, the system may if desired be operated at frequencies lower than 30 megacycles if the wave propagation characteristics of such lower frequency are found not undesirable.

As is explained in my co-pending application Serial No. 612,987, filed August 27, 1945, and entitled Navigation System, now abandoned, whenever signals of unlike but harmonically related frequencies are held in a fixed multiple phase relation to each other, the actual phase relation may be determined by converting the two signals to a common reference frequency equal to the least common multiple of the two frequencies and measuring the phase relation between the two resulting signals of reference frequency.

Furthermore, the navigational pattern resulting is exactly the same as that which would result were signals at the reference frequency radiated from both of the transmitter locations. Such a pattern is represented in Fig. 3, wherein the hyperbolic lines 22 represent the loci of points of equal phase difference between 1200 cycle reference signals radiated from locations A and B. If the lines 22 are taken as representative of the in-phase condition only, then the change in phase relation experienced by a receiving apparatus in moving from one line to another would be a full electrical circle. Furthermore, the number of such lines and therefore the fineness or coarseness of the pattern is a function of the distance of separation of the transmitting locations A and B, a greater distance of separation giving a pattern having a greater number of lines.

Figure 4:
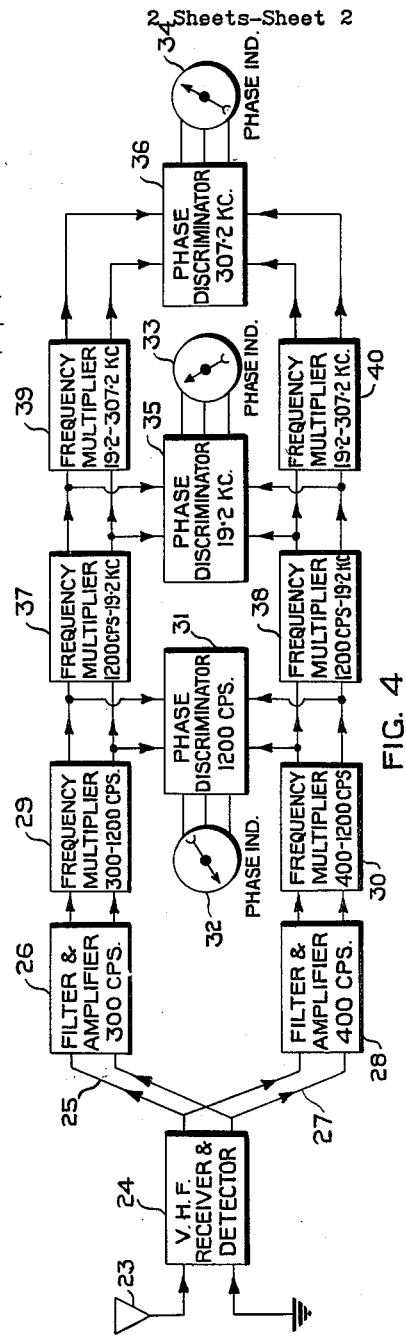
Fig. 4 is a block diagram illustrating one form of receiving apparatus which is particularly adapted for use with the transmitting apparatus shown in Fig. 1.

From the foregoing it is seen that a mobile vehicle equipped with suitable receiving and phase measuring apparatus may determine the line of position extending through its then location by determining the multiple phase relation between the signals at the point of reception. A receiving apparatus suitable for such measurement is illustrated in Fig. 4.

The receiving apparatus includes a receiving antenna 23 coupled to a suitable very high frequency receiver and detector 24. The output of the detector 24 is divided and fed as indicated at 25 to a 300 cycle filter and amplifier 26, and as indicated at 27 to a 400 cycle filter and amplifier 28, it being appreciated that the transmissions from the master transmitter at location A and from the slave transmitter at location B are on the same carrier frequency and are, therefore, simultaneously received by the receiver 24.

The filters and amplifiers 26 and 28 serve to separate the two pulse frequencies into separate channels. The output of the filter 26 is fed to a frequency multiplier 29 serving to produce from the 300 cycle input thereto a 1200 cycle output signal of substantially sine wave form. A similar multiplier 30 receives the 400 cycle output from the filter 28 and produces a second 1200 cycle output signal.

The two 1200 cycle output signals are applied to the two input circuits of a phase discriminator 31. This discriminator may be of the character hereinbefore mentioned and operates to drive a first phase indicator 32. While any suitable type of phase indicator may be employed, the indicator which is described in my co-pending application, Serial No. 612,984, filed August 27, 1945, Patent No. 2,499,326, granted February 28, 1950, and entitled Registering Goniometer, is particularly suited for use with a phase discriminator of the type hereinbefore mentioned.

The phase indicator serves to indicate the phase relation between the two 1200 cycle input signals, and is preferably so arranged that one full revolution of the indicator corresponds to one full electrical circle of phase difference. At the assumed pulse repetition frequencies of 300 and 400 cycles per second, movement of the receiver along a line joining locations A and B will produce one full revolution of the phase indicator 32 for a distance of travel of 77.5 miles.

For more accurate indications I employ a second indicator 33 and a third indicator 34, coupled respectively to phase discriminators 35 and 36. The phase discriminator 35 is coupled to two frequency multipliers 37 and 38 serving to multiply the 1200 cycle input signal by a factor of sixteen to produce an output signal having a frequency of 19.2 kilocycles. This intermediate frequency is also applied to a pair of frequency multipliers 39 and 40, each serving to multiply the input frequency by sixteen to produce output frequencies of 307.2 kilocycles, which are applied to the phase discriminator 36.

Preferably the scale of the first phase indicator 32 is divided into sixteen divisions, each corresponding to one full revolution of the phase indicator 33, the scale of which is preferably also divided into sixteen portions, each corresponding to one full revolution of the third phase indicator 34. The scale of the phase indicator 34 may be sub-divided into any suitable number of graduations, as for example, 100.

With the specific arrangement just described, the indications given for movement of the receiving apparatus along a line joining the transmitter locations A and B are as follows: one revolution of the first phase indicator 32 corresponds to a movement of 77.5 miles, while one division of the first phase indicator 32 corresponds to a distance of 4.85 miles; one division of the second phase indicator 33 corresponds to a distance of movement of 0.303 mile; and one division of the third phase indicator 34 corresponds to a distance of movement of 17.5 feet.

It will be seen that the apparatus just described serves to establish three superimposed scales of measuring, the second sixteen times as fine as the first, and the third sixteen times as fine as the second. Other ratios may of course be used as desired. It will also be appreciated that by properly setting the zero indices on the various phase meter dials, the line of position extending through the receiver location may be determined without ambiguity and with an error in the order of magnitude of a few feet.

From the foregoing it will be observed that I have provided a radio frequency navigation aid which combines the advantageous features of the pulse type navigation systems while retaining the high accuracy, simplicity of operation and rapidity of position determination which characterises the equi-phase displacement systems.

As before mentioned, my invention is not limited to determining a line of position, but instead is applicable also to the determination of a positive fix by determining two intersecting lines of position. To obtain a fix it is only necessary to establish slave transmitting equipment similar to that used for the slave transmitter at location B and to locate the second slave transmitter at a third location. The receiving apparatus would similarly include a third channel for handling the third pulse frequency transmitted from the second slave.

While I have shown and described the preferred embodiment of my invention, I do not desire to be limited to the details of construction which have been illustrated and described herein except as defined in the appended claims.

I claim:

1. In a radio frequency navigational aid, the combination of: a pair of very high radio frequency antennae spaced from each other; means for successively radiating from one of said antennae short pulses of very high frequency energy at a given fixed pulse repetition rate; means for successively radiating from the other of said antennae short pulses of very high frequency energy at a pulse repetition rate different than but harmonically related to said given rate; and means for maintaining a fixed multiple phase relation between said pulse repetition rates.

2. In a radio frequency navigational aid, the combination of: a pair of very high radio frequency antennae spaced from each other; a pair of very high frequency pulse transmitters connected respectively to said antennae and operable to produce short pulses of radio frequency energy of like frequency; a source of alternating potential of given frequency associated with one of said transmitters; a pulse generator connected between said source and said associated transmitter for operating said transmitter in synchronism with said potential of given frequency; another source of alternating potential of a frequency different than but harmonically related to said given frequency and associated with the other of said transmitters; another pulse generator connected between said other source and said other transmitter for operating said other transmitter in synchronism with said potential of other frequency; and means for maintaining a fixed multiple phase relation between the frequencies of pulse production by said transmitters.

3. In a radio frequency navigational aid, the combination of: a master pulse transmitter at one location comprising a very high frequency pulse transmitter operable to produce and radiate short pulses of radio frequency energy, a source of alternating potential of given frequency, and a pulse generator connected between said source and said transmitter for operating said transmitter in synchronism with said potential of given frequency to thereby radiate pulses at a first pulse recurrence frequency equal to said given frequency; and a slave pulse transmitter at another location spaced from said one location comprising means for receiving said pulses of given frequency and producing an output signal synchronized therewith, frequency conversion means connected to said receiver for converting said output signal to an alternating potential of a frequency different than but harmonically related to said given frequency, another very high frequency pulse transmitter operable to produce and radiate short pulses of radio frequency energy, another pulse generator connected between said frequency conversion means and said other transmitter for operating said other transmitter in synchronism with said alternating potential of different frequency to thereby radiate pulses at a different pulse recurrence frequency equal to said different frequency, and means for maintaining a fixed multiple phase relation between the given recurrence frequency of the pulses received by said receiver and the different recurrence frequency of the pulses produced by said other transmitter.

4. In a radio frequency navigational aid, the combination of: a master pulse transmitter at one location comprising a very high frequency pulse transmitter operable to produce and radiate short pulses of radio frequency energy, a source of alternating potential of given frequency, and a pulse generator connected between said source and said transmitter for operating said transmitter in synchronism with said potential of given frequency; and a slave pulse transmitter at another location spaced from said one location comprising means for receiving said pulses of given frequency and producing an output signal synchronized therewith, frequency conversion means connected to said receiver for converting said output signal to an alternating potential of a frequency different than but harmonically related to said given frequency, another very high frequency pulse transmitter operable to produce and radiate short pulses of radio frequency energy, another pulse generator connected between said frequency conversion means and said other transmitter for operating said other transmitter in synchronism with said alternating potential of different frequency, an electronic phase adjuster interposed between said receiver and said other pulse generator, means for comparing the relative phase of said alternating potential of different frequency and the frequency of pulse production by said other transmitter and producing a control potential proportional thereto, and means for so applying said control potential to said electronic phase adjuster as to maintain fixed the relative phase of said alternating potential of different frequency and the frequency of pulse production of said other transmitter.

5. In a radio frequency navigational aid, the combination of: means for radiating from spaced points two continuous series of short pulses of very high radio frequency energy at different but harmonically related pulse recurrence frequencies bearing a fixed multiple phase relation to each other; mobile receiving means for simultaneously receiving the radiations from said spaced points; and means at said receiving means for measuring and continuously indicating the multiple phase relation between the different pulse recurrence frequencies.

6. In a radio frequency navigational aid, the combination of: means for radiating from spaced points two continuous series of short pulses of very high radio frequency energy at different but harmonically related pulse recurrence frequencies bearing a fixed multiple phase relation to each other; mobile receiving means for simultaneously receiving the radiations from said spaced points; means for separating the two received pulse recurrence frequencies to produce a pair of output signals; frequency conversion means for converting said pair of output signals to two alternating potentials of like frequency; and means for measuring and indicating the phase relation between said alternating potentials.

7. In a radio frequency navigation aid, the combination of: a master pulse transmitter at one location comprising a very high frequency pulse transmitter operable to produce and radiate short pulses of radio frequency energy, a source of alternating potential of given frequency, and a pulse generator connected between said source and said transmitter for operating said transmitter in synchronism with said potential of given frequency; and a slave pulse transmitter at another location spaced from said one location comprising means for receiving said pulses of given frequency and producing an output signal synchronized therewith, another very high frequency pulse transmitter operable to produce and radiate short pulses of radio frequency energy, another pulse generator connected between said receiving means and said other transmitter for operating said other transmitter in synchronism with said output signal, an electronic phase adjuster interposed between said receiver and said other pulse generator, means for comparing the relative phase of said output signal and the frequency of pulse production by said other transmitter and producing a control potential proportional thereto, and means for so applying said control potential to said electronic phase adjuster as to maintain fixed the relative phase of said output signal and the frequency of pulse production of said other transmitter.

8. In a radio frequency navigational aid, the combination of: means for radiating from spaced points two continuous series of short pulses of very high radio frequency energy at different but harmonically related pulse recurrence frequencies bearing a fixed multiple phase relation to each other; mobile receiving means for simultaneously receiving the radiations from said spaced points; means for separating the two received pulse recurrence frequencies to produce a pair of output signals; frequency conversion means for converting said pair of output signals to two alternating potentials of like frequency; means for measuring and indicating the phase relation between said alternating potentials; a plurality of pairs of frequency multiplying means arranged in two channels for successively converting said two alternating potentials of like frequency to pairs of equal frequency signals of successively higher frequency; and phase measuring means for each of said pairs of frequency multiplying means for measuring and indicating the phase relation between each of said pairs of equal frequency signals of higher frequency.

WILLIAM J. O'BRIEN.

REFERENCES CITED

The following references are of record in the file of this patent:

UNITED STATES PATENTS

| Number | Name | Date |
|---|---|---|
| 1,615,712 | Loth | Jan. 25, 1927 |
| 2,144,203 | Shanklin | Jan. 17, 1939 |
| 2,328,944 | Beatty | Sept. 7, 1943 |
| 2,403,600 | Holmes et al. | July 9, 1946 |
| 2,403,626 | Wolff et al. | July 9, 1946 |
| 2,405,238 | Seeley | Aug. 6, 1946 |
| 2,406,970 | Smith | Sept. 3, 1946 |
| 2,407,287 | Labin | Sept. 10, 1946 |
| 2,408,773 | Goodall | Oct. 8, 1946 |
| 2,419,525 | Alford | Apr. 29, 1947 |
| 2,422,386 | Anderson | June 17, 1947 |
| 2,428,966 | Gage | Oct. 14, 1947 |
| 2,433,283 | Luck | Dec. 23, 1947 |

FOREIGN PATENTS

| Number | Country | Date |
|---|---|---|
| 546,000 | Germany | Mar. 8, 1932 |